(12) United States Patent
Tze Ming Pang

(10) Patent No.: US 6,741,914 B1
(45) Date of Patent: May 25, 2004

(54) NOTCH FILTERING AS USED IN A DISC DRIVE SERVO

(75) Inventor: Jimmy Tze Ming Pang, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/475,720

(22) Filed: Dec. 30, 1999

Related U.S. Application Data (63) Continuation-in-part of application No. 09/344,632, filed on Jun. 25, 1999.
(60) Provisional application No. 60/130,318, filed on Apr. 21, 1999.

(51) Int. Cl.$^7$ .............................................. G05B 13/00
(52) U.S. Cl. .................... 700/276; 700/28; 318/629; 360/78.04
(58) Field of Search ................ 360/75, 78.04, 360/78.06, 900; 318/629, 611; 700/28, 276

(56) References Cited

U.S. PATENT DOCUMENTS 6,144,181 A * 11/2000 Rehm et al. ............... 318/629
6,163,441 A * 12/2000 Wood et al. ............... 360/266.1
6,219,196 B1 * 4/2001 Semba et al. .................. 360/75
6,256,163 B1 * 7/2001 Schmidt et al. .......... 360/78.04

* cited by examiner

Primary Examiner—Albert W. Paladini
(74) Attorney, Agent, or Firm—Westman, Champlin & Kelly (57) ABSTRACT

A method for optimizing the attenuation of mechanical resonances of actuator driving energy of a disc drive is presented. The method generally involves determining a resonant frequency range of the disc drive, comparing the resonant frequency range to a filter coverage limit, failing the disc drive if the resonant frequency range exceeds the filter coverage limit, and storing notch filter constants in servo flash memory of a servo control processor if the filter coverage limit is not exceeded by the range of resonant frequencies. The notch filter constants configure the notch filter to attenuate the frequencies of the driving energy produced by the servo control processor that are within the resonant frequency range. The notch filter is implemented by the servo control processor each time the disc drive is used. Also presented is a disc drive and a program that are capable of implementing the above-described method.

17 Claims, 5 Drawing Sheets

NOTCH FILTERING AS USED IN A DISC DRIVE SERVO

CROSS-REFERENCE TO CO-PENDING APPLICATION

This application claims the benefit of Provisional APPL. No. 60/130,318 filed Apr. 21, 1999, which is a CIP of U.S. patent application Ser. No. 09/344,632, entitled "IMPROVED NOTCH FILTERING AS USED IN A DISC DRIVE SERVO," filed on Jun. 25, 1999.

FIELD OF THE INVENTION

The present invention relates generally to disc drives. More particularly, the present invention relates to reducing resonant oscillation of the disc drive mechanical structure.

BACKGROUND OF THE INVENTION

A typical disc drive includes one or more discs mounted for rotation on a hub or spindle. A typical disc drive also includes one or more transducers supported by a hydrodynamic air bearing, which flies above each disc. The transducers and the hydrodynamic air bearing are collectively referred to as a data head. A drive controller is conventionally used for controlling the disc drive system based on commands received from a host system. The drive controller controls a disc drive to retrieve information from the discs and to store information on the discs.

An actuator operates within a negative feedback, closed-loop servo system. The actuator moves the data head radially over the disc surface for track seek operations and holds the transducer directly over a track on the disc surface for track following operations. A servo controller samples the position of the data heads relative to some reference point and generates an error signal based upon the difference between the actual position and the reference position. This error signal is then used to drive the data head to the desired reference point, typically by demanding a current through a voice coil motor (VCM) which forms part of the actuator.

Information is typically stored on the discs by providing a write signal to the data head to encode flux reversals on the surface of the disc representing the data to be stored. In retrieving data from the disc, the drive controller controls the actuator so that the data head flies above the disc, sensing the flux reversals on the disc, and generating a read signal based on those flux reversals. The read signal is then decoded by the drive controller to recover the data represented by flux reversals stored on the disc, and consequently represented in the read signal provided by the data head.

Thus, a disc drive mechanical structure is composed of multiple mechanical components that are pieced together to form the final disc drive assembly. Each of these components has various resonant modes that if excited by an external energy source will cause the part to physically move at the natural frequencies of oscillation for the component in question. This movement can occur in a bending mode, a twisting mode or a combination of the two. If the component is highly undamped (i.e. the resonance is high amplitude, narrow frequency band) it will tend to oscillate with a minimal external driving energy. This oscillation results in physical motion of the data head, causing off track errors and potential fly height problems. These oscillations are often referred to as "resonances."

If resonances occur in a disc drive, they can severely limit drive performance, both in seek mode and track-follow mode. To obtain the optimal disc drive performance requires that there be no resonances present. However, this scenario is not physically possible. Every mechanical component has a natural frequency of oscillation. Nevertheless, it is desirable to reduce or minimize the resonances. One way of doing this is to mechanically damp the mechanical components and thereby decrease the amplitude of the resonant mode. This can be done by careful design, the end result being a reduction in the amplitude of the oscillation to a level that is deemed acceptable to achieve a desired drive performance.

However, there are situations where a component is not able to be mechanically damped. This could occur, for example, because of materials used or because of design time constraints. When this scenario occurs, the only way to improve drive performance is to make sure that no excitation energy at the natural frequency of oscillation reaches the mechanical component to start it oscillating. The present invention concentrates on this approach.

As mentioned above, typical disc drives demand a current through a voice coil motor (VCM) to drive the data head to the desired position. When a frequency spectrum of demand current is analyzed it is found that the spectrum is composed of frequency components from direct current (DC) all the way up to multiple kilohertz (kHz). If VCM current is driving the actuator at the same frequency as the natural frequency of a mechanical resonant mode of a mechanical component, the energy may be sufficient to excite the mechanical structure into oscillation. This is very undesirable and will at least degrade disc drive performance or at worst will cause the servo system to be unstable.

The method employed by servo engineers to minimize the chances of the mechanics oscillating is to use hardware electronic filtering and/or digital filtering of the VCM current via a microprocessor or digital signal processor. Both types of filters achieve the same overall result. They reduce the driving force energy (i.e. the current flowing) at frequencies deemed a concern.

One type of filter that is widely used to remove driving energy at the mechanical resonant modes is known as a notch filter. A notch filter is a band-rejection filter that produces a sharp notch in the frequency response curve of the disc drive. When a notch filter is activated by the servo control loop, the open loop response becomes a summation of the original response plus the notch filter response. If the notch filter is centered about the frequency where the peak amplitude of the mechanical resonance occurs, then the driving force energy at this frequency can be reduced so that there will be little or no energy made available to excite the mechanical structure.

The problem with the notch filter, however, is that if the center frequency of the mechanical resonance does not align with the center frequency of the notch filter then the attenuation of the driving current may not be enough to keep the structure from going into oscillation. This will occur if the mechanical resonance has shifted in frequency. This can easily occur on a drive to drive basis or even from one data head to another.

Present disc drives have fixed notch filters that are designed to cover a spread in mechanics. Such a filter, for example, is described in U.S. Pat. No. 5,032,776. Such filters remove driving energy at frequencies which would not cause the mechanical structure to oscillate for a given head or for a given drive. Thus, they are not optimal solutions. Furthermore, such filters cannot guarantee that the gain of the resonance will remain below 0 dB.

Methods also exist to implement adaptive filtering techniques by implementing digital signal processing algorithms in the servo controller. Such a method, for example, is described in U.S. Pat. No. 5,325,247. Such methods involve complex microcontroller code and are heavy on computational time. Furthermore, such methods cannot also guarantee optimal results under all circumstances.

As disc drive servo systems continually require higher open loop bandwidths to track follow accurately, the requirement for improved filtering techniques increases also. The present invention provides an economical means of providing a high degree of attenuation of the mechanical resonance frequencies and offers other advantages over the prior art.

SUMMARY OF THE INVENTION

The present invention relates to a method and apparatus for providing improved attenuation of the mechanical resonant frequencies in a disc drive.

One embodiment of the invention is directed to a method of filtering the actuator driving energy to reduce the frequency components which correspond to resonant frequencies that are present in the disc drive mechanical structure using a notch filter. In accordance with this embodiment, a resonant frequency range is determined by establishing a minimum resonant mode and a maximum resonant mode by performing a bode/structural plot of the disc drive. When the resonant frequency range is less than a coverage limit, the notch filter is used to attenuate the range of resonant frequencies. However, if the range of resonant frequencies exceeds the coverage limit, then the disc drive can be failed.

Another embodiment of the present invention is directed to a computer disc drive having various resonant modes covering a resonant frequency range. The disc drive includes at least one disc, multiple data heads, an actuator, a servo control processor and a digital notch filter. The discs are capable of storing data. The data heads are capable of reading data from and writing data to the discs. The actuator is coupled to the data heads for positioning the data heads relative to the discs in response to driving energy. The servo control processor is coupled to the actuator and is capable of providing driving energy to the actuator. The digital notch filter is adapted to attenuate the frequency components of the actuator driving energy contained within the resonant frequency range of the disc drive. Notch filter constants which define the frequency response of the digital notch filter are stored in a servo flash memory of the servo control processor. The servo control processor loads the notch filter constants when the disc drive is used.

These and various other features as well as advantages which characterize the present invention will be apparent upon reading of the following detailed description and review of the associated drawings.

DETAILED DESCRIPTION OF ILLUSTRATIVE EMBODIMENTS

Figure 1:
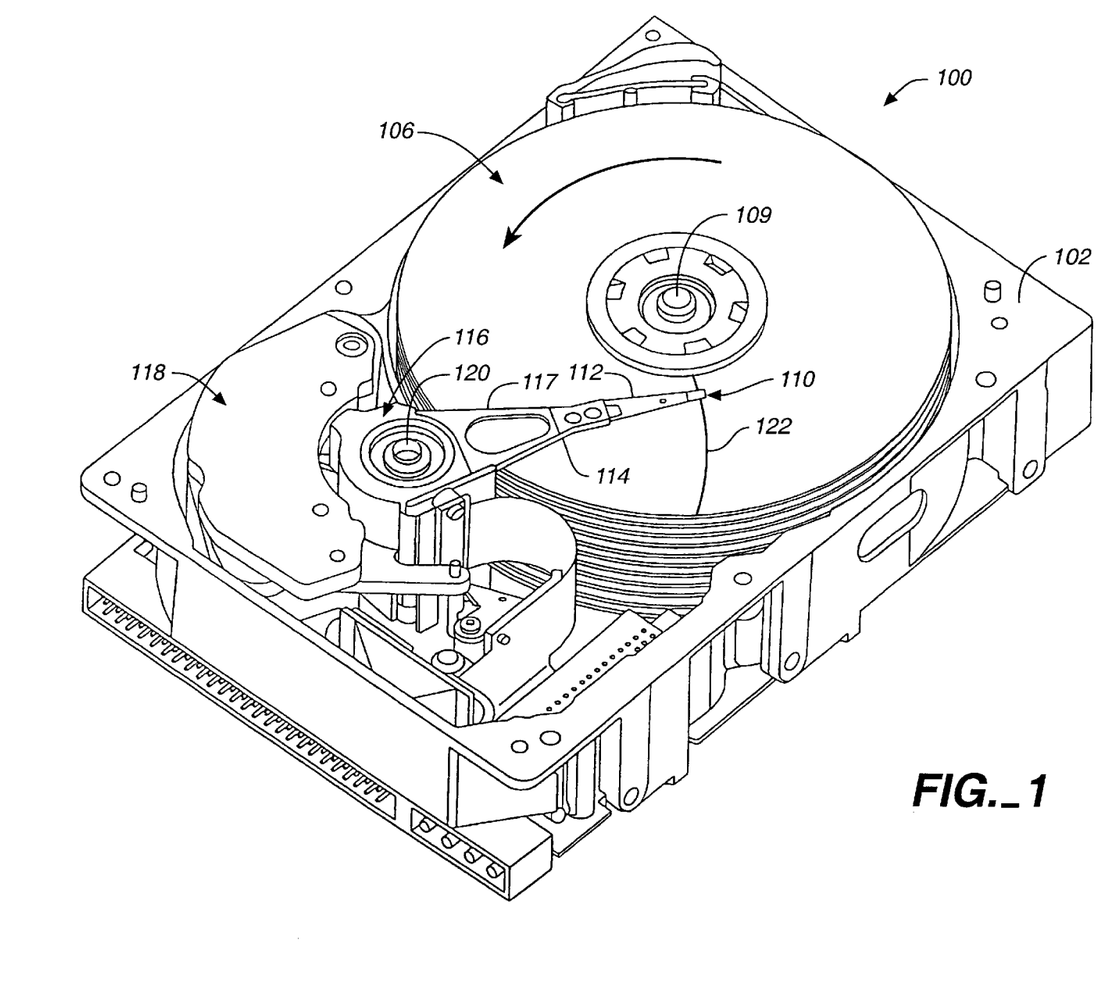
FIG. 1 is a top view of a disc drive in accordance with one embodiment of the present invention.

FIG. 1 is a top view of a disc drive 100 in accordance with one embodiment of the present invention. Disc drive 100 includes a disc pack 106 mounted for rotation about spindle 109. Disc pack 106 includes a plurality of individual discs, each of which include concentric tracks, or cylinders, for receiving and storing data in the form of magnetic flux reversals encoded on the tracks. It should be noted that although the present invention is described herein with reference to a magnetic disc system, the invention is equally applicable to disc drives which utilize discs employing other means of data storage, such as optical discs. Disc drive 100 also includes an actuator 116 mounted to a base 102 and pivotally moveable relative to discs 106 about pivot shaft 120. Actuator 116 includes an actuator arm assembly 117 which includes a plurality of actuator arms 114. Each actuator arm 114 is attached to one or more flexure arms 112. Each flexure arm 112 supports a data head 110. Data head 110 includes a hydrodynamic air bearing, or slider, which supports a transducer for reading information from and encoding information to one of the discs 106. In a preferred embodiment, actuator 116 includes a voice coil motor, shown generally at 118. Disc drive 100 further includes a drive controller (not shown) which is coupled to a host system or another controller which controls a plurality of drives. In an illustrative embodiment, the drive controller is a microprocessor, or digital computer. The drive controller is either mountable within disc drive 100, or is located outside of disc drive 100 with a suitable connection to actuator 116.

During operation, the drive controller receives position information indicating a track of the disc 106 to be accessed. The drive controller receives the position information from an operator, from a host computer, or from another suitable controller. Based on the position information, the drive controller provides a position signal to actuator 116. The position signal causes actuator 116 to pivot about pivot shaft 120. In an illustrative embodiment, the position signal comprises a current supplied to the voice coil motor 118, causing actuator 116 to pivot about pivot shaft 120. This, in turn, causes data head 110 to move radially over the surface of the disc 106 in a generally arcuate path indicated by arrow 122.

Figure 2:
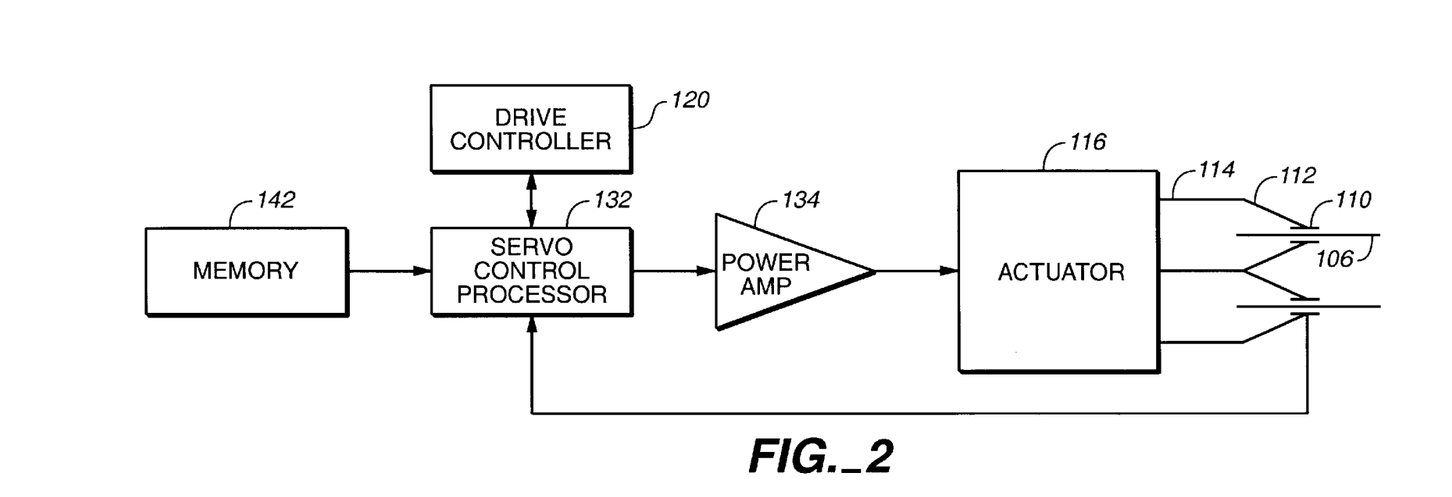
FIG. 2 is a block diagram depicting a negative feedback, closed-loop servo system according to one embodiment of the present invention.

Actuator 116 operates within a negative feedback, closed-loop servo system depicted in the block diagram of FIG. 2. Drive controller 130 receives a command signal which indicates that a certain portion of a disc 106 is to be accessed. In response to the command signal, drive controller 130 provides servo control processor 132 with a signal indicating which data head 110 is selected for reading from or writing to disc 110. Drive controller 130 also provides servo control processor 132 with a position signal which indicates a particular cylinder over which actuator 116 is to position the data heads 110. Servo control processor 132 converts the position signal into an analog driving energy signal which is provided to actuator 116. In an illustrative embodiment, the driving energy signal is amplified by power amplifier 134, which then provides the required driving energy to actuator 116. In response to the driving energy, actuator 116 moves the data head 110 radially over the surface of the disc 106 for track seek operations and holds the data head 110 directly over a track on the disc 106 for track following operations. In an illustrative embodiment, the driving energy comprises an electrical current which is supplied to voice coil motor 118. Once the data head 110 is appropriately positioned, the drive controller executes a desired read or write operation.

Servo control processor 132 samples the position of the data head 110 and compares the actual position of the data head 110 with the desired position requested by drive controller 130. Based upon the difference between the actual position and the desired position of the data head 110, servo control processor 132 then generates a corrective driving energy signal which is provided to the actuator 116. In an illustrative embodiment, the corrective driving energy signal is amplified by power amplifier 134, which then provides the required driving energy to actuator 116. In response to the corrective driving energy, actuator 116 drives the data head 110 to the desired position.

Figure 3:
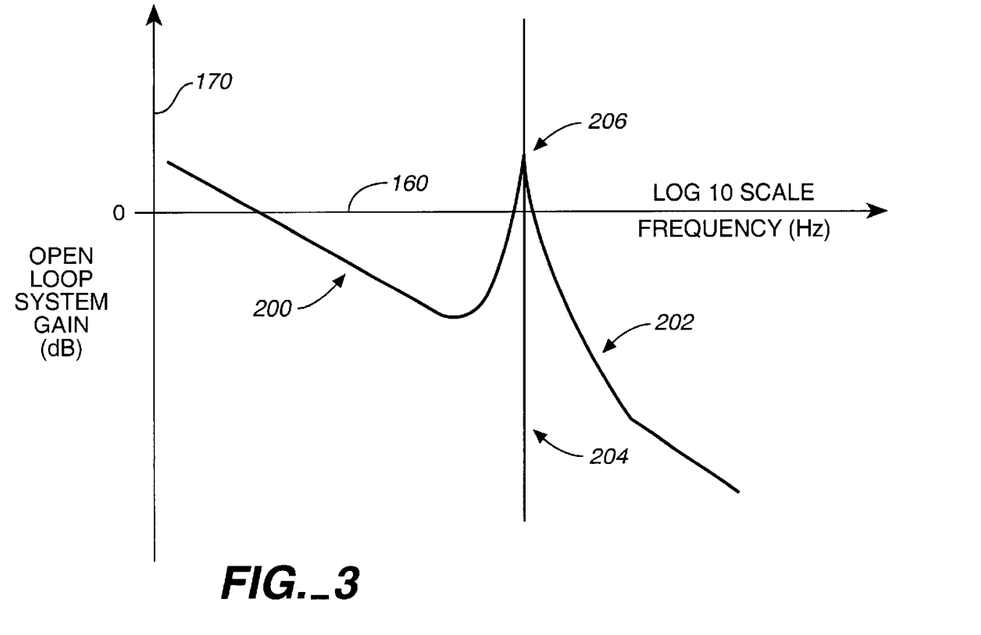
FIG. 3 is a Bode plot showing a mechanical resonance in a disc drive.

Each of the mechanical components of disc drive 100 has various resonant modes that, if excited by an external energy source, will cause the part to oscillate at the natural resonance frequencies of the component. FIG. 3 is an open loop Bode plot showing a mechanical resonance 202 of a disc drive 100. The mechanical resonance 202 could relate to a particular data head 110 and actuator arm 114. For clarity's sake, the phase information has been removed from the Bode plot and the plot is not shown to scale. The x-axis 160 represents the frequency of the excitation energy, while the y-axis 170 represents the open loop system gain in decibels (dB). The open loop system gain 200 generally drops at the rate of 20 dBs per decade. However, a mechanical resonance causes a sharp increase 202 in the system gain 200. The resonance 202 depicted in FIG. 3 is centered at center frequency 204 and has a peak amplitude 206. A mechanical resonance could cause the servo control loop to go unstable if the phase response goes through −180° when the gain is above 0 dB. Therefore, because the peak amplitude of the gain of the resonance frequency in FIG. 3 exceeds 0 dB, the resonance could lead to control instability.

Figure 4:
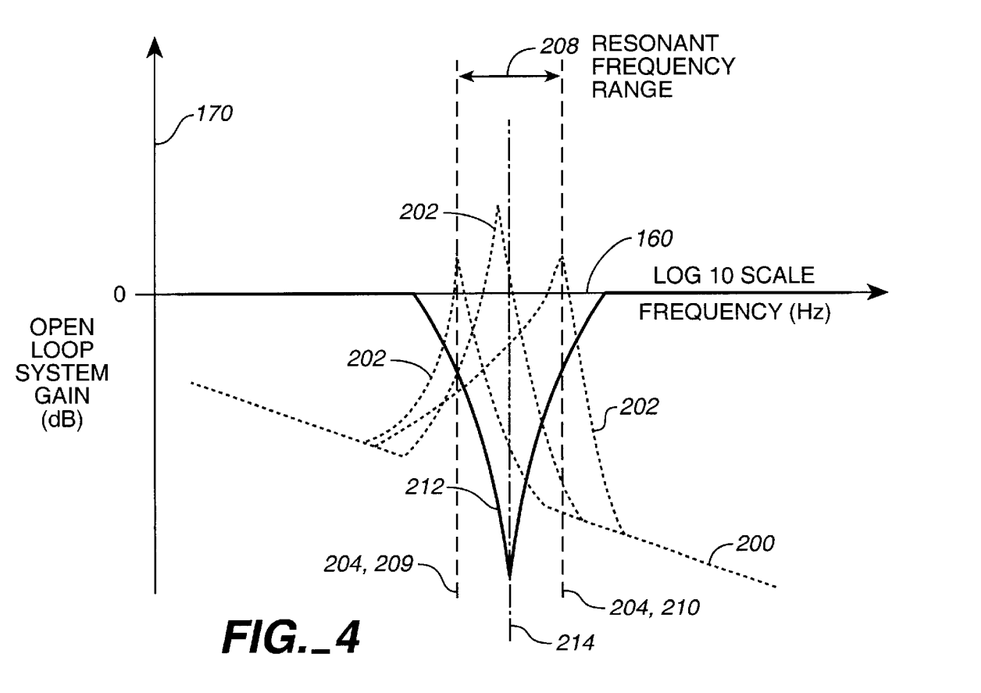
FIG. 4 is a Bode plot showing multiple resonant modes of a disc drive and the frequency response of a digital notch filter in accordance with one embodiment of the invention.

In one embodiment of the invention, the resonant frequency of each data head 110 is determined by subjecting each data head 110 to driving energies over a wide range of frequencies, measuring the structural response at each frequency, and determining where the magnitude of the structural response peaks using a standard peak detection algorithm. Generally, the resonant frequencies the data heads 110 of disc drive 100 are similar. However, subtle differences can be seen in the frequency, gain, phase, width of the frequency band, or a combination of all four for any particular resonance 202. Once the structural response of each data head 110 has been characterized, a resonant frequency range 208, shown in FIG. 4, for the disc drive mechanical structure can be determined. As in FIG. 3, the x-axis 160 represents the frequency of the driving energy, while the y-axis 170 represents the system gain in decibels (dB). In addition, FIG. 4 is not shown to scale and the phase response is not shown. The resonant frequency range 208 generally extends from a minimum resonant mode 209 of disc drive 100 corresponding to the data head 110 having the lowest resonant frequency and a maximum resonant mode 210 of disc drive 100 corresponding to the data head 110 having the highest resonant frequency.

Figure 5:
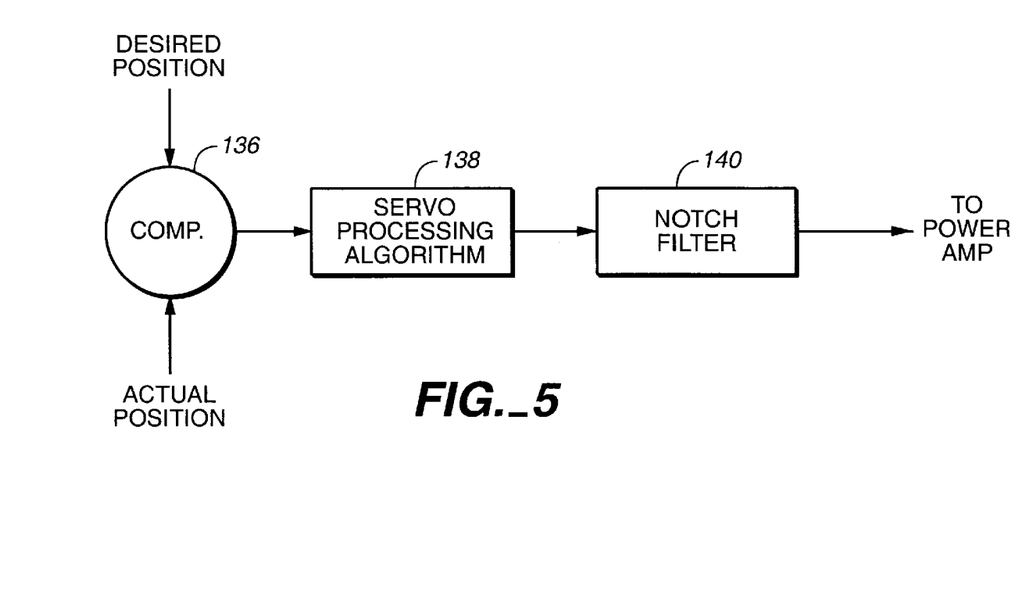
FIG. 5 is a simplified block diagram of a servo control processor according to one embodiment of the present invention.

FIG. 5 is a simplified block diagram of servo control processor 132 in accordance with one embodiment of the invention. Comparator 136 receives an input signal from drive controller 130 corresponding to the desired position of data head 110. Comparator 136 also receives a feedback signal from head 110 corresponding to the actual position of head 110. Based on the difference between the desired position signal and the actual position signal, comparator 136 generates a position error signal. The position error signal is provided to a servo processing algorithm 138, which generates a driving energy signal which is composed of frequency components which range from direct current (DC) to multiple kilohertz or higher. In one embodiment of the invention, the driving energy signal is provided to a digital notch filter 140 which reduces the frequency components of the driving energy that are within resonant frequency range of the disc drive mechanical structure. The digital notch filter 140 then provides the filtered driving energy signal to actuator 116, either directly or via power amp 134. Thus, the actuator 116 can position the data head 110 at the desired location with a reduced risk of exciting the disc drive mechanical structure into oscillation.

Referring again to FIG. 4, one embodiment of notch filter 140 having a frequency response 212 that is configured such that its center frequency 214 is positioned at the middle of the resonant frequency range of disc drive 100 or at the average of the minimum resonant frequency mode 209 and the maximum resonant frequency mode 210. Additionally, the width of notch filter 140 is configured such that it spans resonant frequency range 208 to attenuate resonances 202 such that instability in the control loop can be avoided. Note that the width of notch filter 140 must extend beyond the resonant frequency range to sufficiently attenuate the minimum and maximum resonant modes 209, 210 due to the fact that the effectiveness of single notch filter 140 falls off as the frequencies approach its roll off frequencies or −3 Db frequencies.

However, the width of notch filter 140 is limited since it will cause a phase loss in the control loop, which can lead to instability. The wider the notch filter 140, the greater the phase loss. Therefore, it is important that the width of the single digital notch filter 140 not exceed a coverage limit, which, if exceeded, would lead to instability in the control loop. The coverage limit for notch filter 140 generally depends on the disc drive used.

Figure 6:
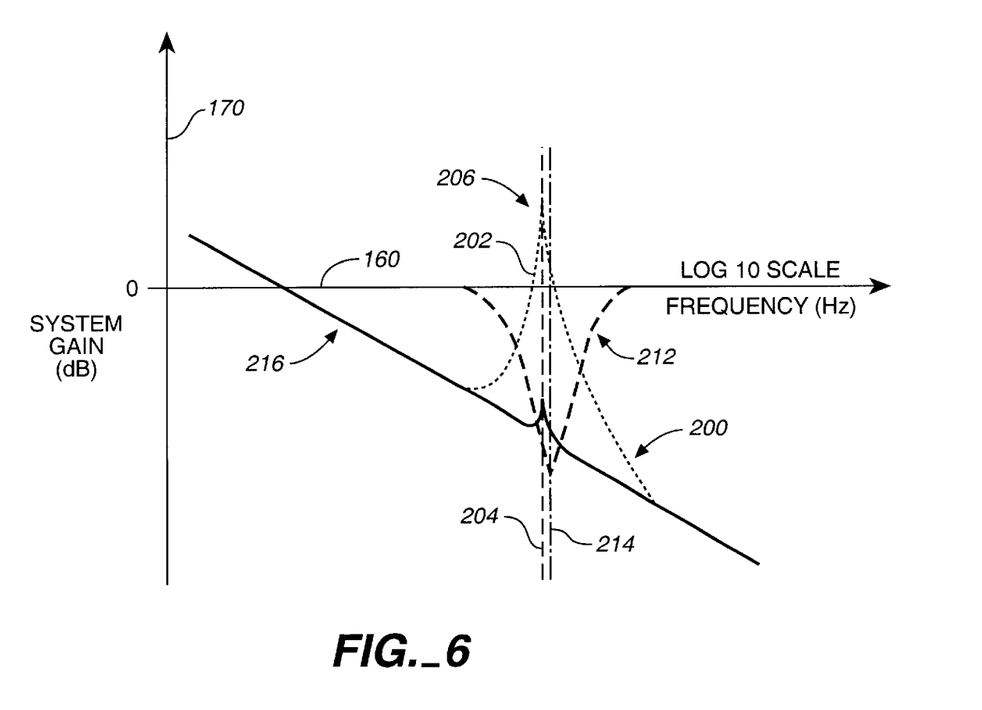
FIG. 6 is a Bode plot showing the effect of a digital notch filter according to the present invention.

An example of the effect of notch filter 140 is illustrated in the Bode plot of FIG. 6, which for clarity's sake does not show the phase response and is not shown to scale. As in FIG. 2, the x-axis 160 represents the frequency of the driving energy, while the y-axis 170 represents the system gain in decibels (dB). FIG. 6 shows the open loop response 200 of the disc drive mechanical structure when one of the data heads 110 is in use, resulting in a sharp increase in the gain 200. Also shown is the frequency response 212 of notch filter 140 and the resulting open loop frequency response 216 which is a summation of the response 200 and the frequency response 212 of notch filter 140. It can be seen that the peak amplitude 206 of the resonant 202 has been significantly reduced below 0 dB, thus ensuring control loop stability.

Various methods of implementing a digital notch filter 140 are known in the art. In an illustrative embodiment, the digital notch filter 140 implements a bilinear transfer function of the form:

$$G(Z) = \frac{B_o + B_1 z^{-1} + B_2 z^{-2}}{1 - A_1 z^{-1} - A_2 z^{-2}}$$

where G is the gain of the filter, z is the sampling rate of the servo system, and $A_1$, $A_2$, $B_0$, $B_1$ and $B_2$ are digital notch filter constants describing the frequency, depth and width of the notch. In the preferred embodiment, the digital notch filter constants are selected such that the notch filter 140 is tuned to cover just the resonances 202 that are within the resonant frequency range 208. As a result, the notch filter 140 can be optimized such that the phase loss caused by the notch filter 140 is minimized. In another embodiment of the invention, the notch filter constants are selected from a table, such that the center frequency 214 of the notch filter 140 is proximate the midpoint of the range of resonant frequencies.

The digital notch filter constants for notch filter 140 can stored in memory 142, which is implemented as a computer data storage device, as shown in FIG. 2. In one embodiment of the invention, memory 142 is a servo flash memory of servo control processor 132. In this embodiment, servo control processor 132 loads the notch filter constants each time disc drive 100 operates.

Figure 7:
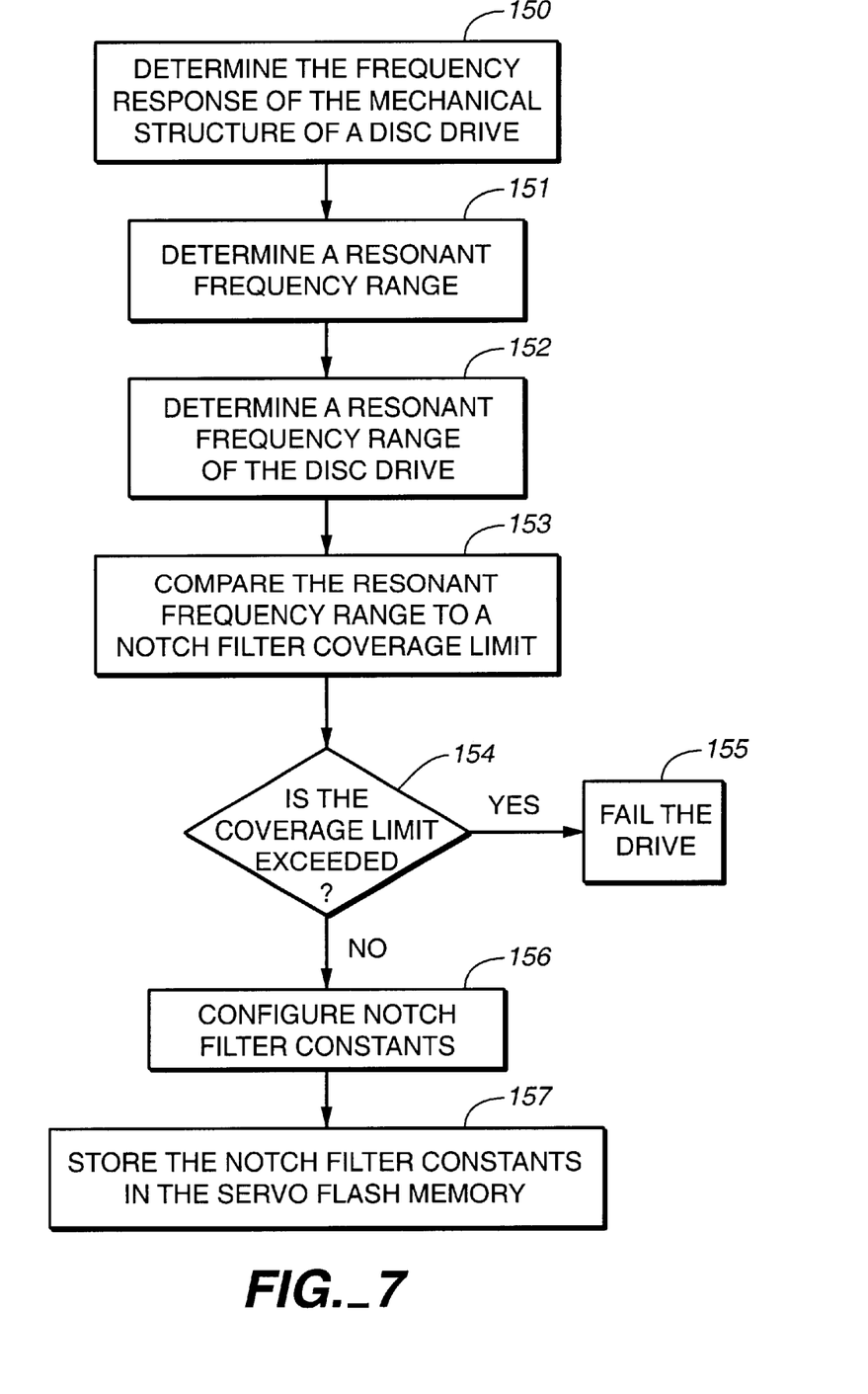
FIG. 7 is a flowchart representing a method of filtering the actuator driving energy in accordance with one embodiment of the invention.

FIG. 7 is a flowchart representing a method for optimizing the attenuation of the frequency components of the driving energy that are in the resonant frequency range 208 of a disc drive 100. At step 150, the frequency response of the mechanical structure of a disc drive 100 is determined by subjecting each data head 110 to driving energies over a wide range of frequencies as discussed above. Next, at step 151, the resonant frequency range 208 is obtained by subtracting the maximum resonant mode 209 from the minimum resonant mode 209. The resonant frequency range 208 of the disc drive 100 is compared to the filter coverage limit at step 153 and a decision is made as to whether the filter coverage limit has been exceeded at step 154. If the filter coverage limit has been exceeded, the disc drive should be failed as indicated in step 155. If the resonant frequency range 208 is within the filter coverage limit, then a notch filter 140 can be configured, at step 156, that will sufficiently attenuate the resonances 202 of the mechanical structure such that instability in the control loop is less likely to occur. Finally, at step 157, the notch filter constants are stored in the servo flash memory of the servo control processor. The servo control processor 132 can load the notch filter constants from the servo flash memory and implement the notch filter 140 each time the disc drive is used.

In one alternative embodiment of the invention, the digital notch filter constants are stored in erasable memory. This allows the digital notch filter constants to be easily changed if one or more mechanical resonances shift due to the replacement of a component of the disc drive or due to the replacement of the disc drive itself. In another embodiment, the digital notch filter constants are stored in a memory location that is separate from the memory device used to store the servo control code. This embodiment has the advantage that no changes to the actual servo control code would be required should a mechanical resonance shift in frequency perhaps due to a change in component vendor.

Another embodiment of the invention is directed toward a computer readable medium having stored instructions, executable by a processor, that are capable of optimizing the attenuation of the resonant frequencies of the driving energy. In general, the instructions are capable of performing the method illustrated in the flowchart of FIG. 7.

In summary, one embodiment of the present invention is directed to a method of filtering the actuator driving energy to reduce the frequency components which are approximately equal to the resonance frequencies of the disc drive mechanical structure. The method generally involves determining a resonant frequency range 208 of the disc drive 100, comparing the resonant frequency range 208 to a filter coverage limit, failing the disc drive 100 if the resonant frequency range 208 exceeds the filter coverage limit, and storing notch filter constants in servo flash memory 142 of servo control processor 132 if the filter coverage limit is not exceeded by the range of resonant frequencies. The notch filter constants configure the notch filter 140 to attenuate the frequencies of the driving energy produced by servo control processor 132 that are within the resonant frequency range. The notch filter 140 is implemented by the servo control processor 132 each time the disc drive is used. This embodiment of the invention can be implemented by instructions stored in a computer readable medium and executable by a processor.

Another embodiment of the invention is directed toward a disc drive 100 having various resonant modes 202 that are positioned within a resonant frequency range. The disc drive 100 includes at least one disc 106, multiple data heads 110, an actuator 106, a servo control processor 132, and a digital notch filter 140. The discs 106 are capable of storing data. The data heads 110 are capable of reading data from and writing data to the discs 106. The actuator 116 is coupled to the data heads 110 for positioning the data heads 110 relative to the discs 106 in response to driving energy. The servo control processor 132 is coupled to the actuator 116 and is capable of providing driving energy to the actuator 116. The digital notch filter 140 reduces the frequency components of the driving energy that are within the resonant frequency range of the disc drive 100. The digital notch filter 140 is defined by notch filter constants which are stored in a servo flash memory 142 of the servo control processor 132. The notch filter constant can be loaded by the servo control processor 132 to implement the notch filter 140 each time the disc drive 100 is used.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, with reference to FIGS. 2 and 5, notch filter 140 can be implemented as a component that is separate from servo control processor 132. Also, with reference to FIG. 2, notch filter 140 can be positioned between power amp 134 and actuator 116. Other modifications can also be made.

What is claimed is:

1. A method for optimizing driving energy supplied to an actuator in a system comprising steps of:

a) determining a frequency response of mechanical structures within the system;

b) determining a resonant frequency range between a minimum resonant mode and a maximum resonant mode;

c) configuring a frequency response of a digital notch filter to attenuate frequency components of the driving energy that are within the resonant frequency range; and d) storing notch filter configuration information of the digital notch filter in response to d), whereby the system can implement the digital notch filter when the system is used.

2. The method of claim 1, wherein the notch filter configuration information includes notch filter constants which define a center frequency and a width of the frequency response of the digital notch filter; and wherein the configuring step c) further comprises:

c)i) setting the notch filter constant defining the center frequency such that the center frequency is proximate to a midpoint of the resonant frequency range; and d)ii) setting the notch filter constant defining the width such that the width covers the resonant frequency range.

3. The method of claim 1, wherein the determining step a) includes analyzing a structural bode plot.

4. The method of claim 1, wherein the configuring step c) comprises implementing a bilinear transfer function of the form:

$$G(Z) = \frac{B_o + B_1 z^{-1} + B_2 z^{-2}}{1 - A_1 z^{-1} - A_2 z^{-2}}$$

where G is the gain of the filter, z is the sampling rate of the servo control processor, and $A_1, A_2, B_0, B_1$ and $B_2$ are digital notch filter constants that define the center frequency, depth, and width of the frequency response of the digital notch filter.

5. The method of claim 1 including failing the system if the resonant frequency range exceeds a coverage limit.

6. A system having various resonant modes that are positioned within a resonant frequency range, the system comprising:

an actuator adapted to controllably position a head in response to actuator driving energy;

a digital notch filter adapted to attenuate the frequency components of the actuator driving energy contained within the resonant frequency range of the disc drive, the digital notch filter being defined by digital notch filter constants;

a memory containing the digital notch filter constants;

a control processor coupled to the actuator and adapted to controllably provide the driving energy to the actuator and load the notch filter constants when the system is used.

7. The system of claim 6, wherein the actuator comprises a voice coil motor and wherein the driving energy comprises electrical current.

8. The system of claim 6, wherein the digital notch filter is implemented according to a bilinear transfer function of the form:

$$G(Z) = \frac{B_o + B_1 z^{-1} + B_2 z^{-2}}{1 - A_1 z^{-1} - A_2 z^{-2}}$$

where G is the gain of the filter, z is the sampling rate of the servo system, and $A_1, A_2, B_0, B_1$ and $B_2$ are digital notch filter constants describing the frequency, depth and width of the frequency response of the digital notch filter.

9. The system of claim 6, further comprising a power amplifier adapted to amplify the driving energy.

10. The system of claim 9, wherein the power amplifier amplifies the driving energy after the driving energy is filtered by the digital notch filter.

11. The system of claim 9, wherein the power amplifier amplifies the driving energy before the driving energy is filtered by the digital notch filter.

12. A computer readable medium having stored instructions, executable by a processor, the instructions comprising:

instructions for determining a resonant frequency range of a system defined as a range of frequencies, within which, various resonant modes of the system are contained; and instructions for configuring a frequency response of a digital notch filter to attenuate the frequency components of the driving energy that are within the resonant frequency range, wherein notch filter constants define the frequency response of the digital notch filter; and instructions for storing the notch filter constants, whereby the system can implement the digital notch filter when the system is used.

13. The instructions of claim 12, wherein the notch filter constants define a center frequency and a width of the frequency response of the digital notch filter; and wherein the configuring instructions include:

instructions for setting the notch filter constant defining the center frequency such that the center frequency is proximate to a midpoint of the resonant frequency range; and instructions for setting the notch filter constant defining the width such that the width covers the resonant frequency range.

14. The instructions of claim 12, wherein the instructions for configuring the frequency response comprises implementing a bilinear transfer function of the form:

$$G(Z) = \frac{B_o + B_1 z^{-1} + B_2 z^{-2}}{1 - A_1 z^{-1} - A_2 z^{-2}}$$

where G is the gain of the filter, z is the sampling rate of the servo control processor, and $A_1, A_2, B_0, B_1$ and $B_2$ are digital notch filter constants that define the center frequency, depth, and width of the frequency response of the digital notch filter.

15. The method of claim 12 including failing the system if the resonant frequency range exceeds a coverage limit.

16. A system comprising:

an actuator adapted to be driven by a driving energy; and means for filtering the driving energy to minimize the frequency components which are substantially equal to the resonance frequencies of the disc drive mechanical structure.

17. The system of claim 16 wherein the actuator comprises a voice coil motor and wherein the driving energy comprises electrical current.

* * * * *

UNITED STATES PATENT AND TRADEMARK OFFICE
CERTIFICATE OF CORRECTION

PATENT NO. : 6,741,914 B1
DATED : May 25, 2004
INVENTOR(S) : Jimmy Tze Ming Pang It is certified that error appears in the above-identified patent and that said Letters Patent is hereby corrected as shown below:

Column 8,
Line 60, delete "d)" and insert -- c) --

Signed and Sealed this

Fifth Day of October, 2004

JON W. DUDAS
*Director of the United States Patent and Trademark Office*